Patented Oct. 13, 1953

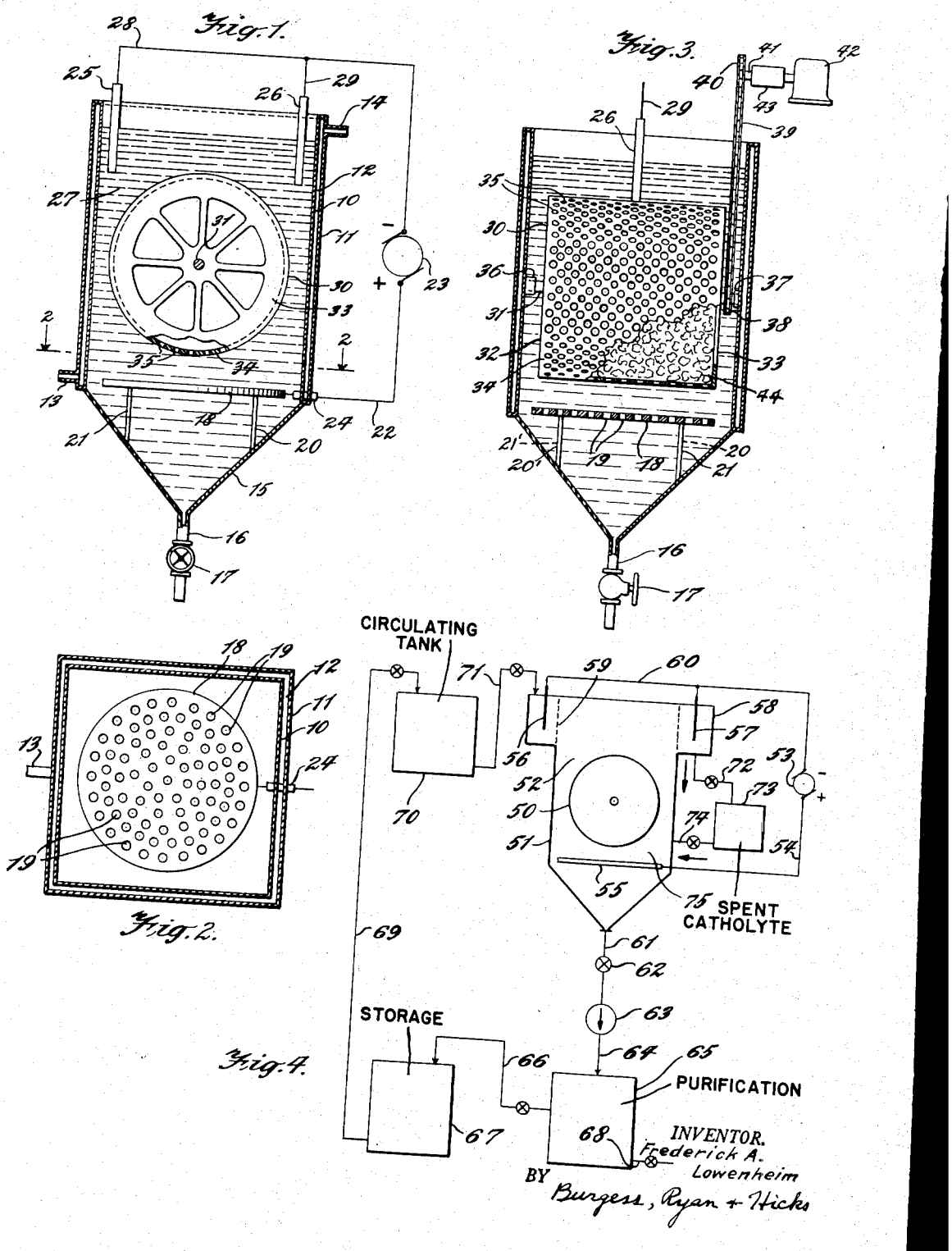

2,655,473

UNITED STATES PATENT OFFICE 2,655,473

ELECTROLYTIC DETINNING

Frederick A. Lowenheim, Plainfield, N. J., assignor to Metal & Thermit Corporation, New York, N. Y., a corporation of New Jersey Application July 20, 1948, Serial No. 39,727

3 Claims. (Cl. 204—121)

This invention relates to the recovery of tin from tin bearing material such as tin plate, old cans, terne plate, and the like, which for convenience will hereinafter be referred to as tin scrap. The invention particularly relates to a detinning method and apparatus in which the scrap is immersed in an electrolytic bath solution wherein it functions as a bipolar electrode and in which anodic oxygen produced in the bath helps to detin the scrap.

According to the invention, the scrap may be rotated in the bath intermittently or continuously without the necessity of providing extra electrical equipment, such as a rotating electrical connection, which would otherwise be required in conventional electrolytic detinning processes in which the scrap is directly connected in the circuit as the anode. The invention also makes it possible to construct detinning apparatus of much larger size than is ordinarily possible in conventional processes since only a part of the detinning is performed electrolytically, the other part being carried on simultaneously by means of the anodic oxygen. As a further advantage, the invention provides a high quality grade of tin as a product of the detinning process.

Stated briefly, the invention involves a bath of aqueous caustic alkali solution having tin scrap submerged therein intermediate an anode and a cathode which are maintained in the bath out of contact with the scrap. Means are provided for supplying electric current to the anode and for removing it from the cathode, and a source of current is provided outside the bath to which said means are connected. In the operation of the bath, the current passes from the anode to and through the solution to the scrap, through the scrap, and then to and through the solution to the cathode. The scrap behaves like a bipolar electrode, that portion of it adjacent the anode being cathodic, and the portion adjacent the cathode being anodic. Oxygen gas is generated from the solution at the anode and passes upwardly through and in intimate contact with the scrap, which is so positioned in the path of the oxygen as to intercept or be impinged by it, thus aiding to dissolve the tin. Preferably the scrap is positioned above the anode. If caustic soda is the alkali used in the bath, the dissolved tin will be in the form of sodium stannate, which ionizes to produce positive sodium and negative stannate ions. The latter, upon reaching the cathode, are decomposed and deposit their tin content thereon. The net result is that the tin is dissolved from the scrap and plated on the cathode.

The invention may be better understood by referring to the accompanying drawing in which a preferred embodiment is diagrammatically illustrated and in which:

Fig. 1 is a vertical section of a plating vessel having a rotatable scrap drum or container and is taken at right angles to the axis of rotation of the scrap drum, a portion of the drum being broken away;

Fig. 2 is a section along the line 2—2 of Fig. 1;

Fig. 3 is a vertical section of the plating vessel looking at the front of the drum, a portion of which is broken away; and Fig. 4 is a flow diagram of a detinning process employing a modified detinning apparatus.

The apparatus comprises a tank or vessel 10 of any conventional shape such as the rectangular form shown and having a more or less square cross section. Tank 10 is surrounded by jacket 11 to provide an intermediate space 12 through which a heat exhange medium may be circulated by means of inlet 13 and outlet 14. The bottom 15 of tank 10 has a generally conical shape and terminates in the pipe 16 controlled by valve 17. An anode in the form of a circular plate 18, having perforations 19, is provided at the bottom of the tank and is supported therein by non-conducting or insulated supports 20, 20', 21, and 21'. Plate 18 is of such thickness that its resistance is negligible. The electrical connection 22 connects the anode to an exterior source of direct current 23, a sleeve 24 being provided in the wall of tank 10 through which the connection or lead 22 passes. If desired, current may be fed to the anode plate from opposite sides thereof. Any source of direct current is suitable, such as a motor generator, a rectifier, etc.

A pair of cathodes 25 and 26 are provided adjacent the top portion of the tank and, as shown, extend for some distance into the bath solution 27. They are connected to the source of current 23 by means of leads 28 and 29. The number of cathodes, and their shape and length, are variable, and may be selected to accord with favorable operating practice. The position of the cathodes in the bath is also variable to some extent, but they should always be so placed with respect to the scrap as to prevent the current from by-passing the scrap. The cathodes are shown in Fig. 1 at the sides of the scrap drum in order to permit charging and removal of the scrap.

Intermediate the top and bottom portions of the tank there is mounted a rotatable drum or container 30 which comprises a shaft 31 having wheel-shaped supports 32 and 33 secured adjacent each end thereof. A perforated, cylindrically shaped shell or covering 34 having perforations 35 is attached to the supports 32, 33. The shaft 31 is journaled in bearings 36, 37, secured to the inner walls of the tank. Shaft 31 also carries a gear wheel 38 at one end thereof which is engaged by the chain 39, the latter being driven by gear wheel 40 mounted on the shaft 41. Shaft 41 is driven by motor 42 through the intermediate gear reducer 43.

Scrap 44, such as tin plate clippings and the like, is loosely packed in the form of variously sized fragments and pieces in drum 30 and may be continuously or intermittently moved or agitated in the bath through rotation of the drum. During passage of the current from the anode 18 to the cathodes 25, 26, the scrap acts as a bipolar electrode. According to the principle of bipolar electrodes, although the scrap is not directly connected in the electric circuit, it yet serves to conduct current. This is because the resistance to the current offered by the scrap is less than that offered by the solution intermediate the anode and the cathodes, and hence at least some current will tend to flow through the scrap. That portion of the scrap which the current enters after leaving the solution is cathodic, in accordance with familiar electrochemical principles, and that portion of the scrap which the current leaves to enter the solution is anodic. Consequently, the scrap nearest the anode 18 acts like a cathode and that nearest the cathodes 25, 26 acts like an anode. Since the tin with which the scrap is plated is soluble in the bath, it will dissolve from the anodic portion of the scrap and will be plated out of the solution upon the cathodes 25, 26.

As indicated above, the bath comprises an aqueous solution of caustic alkali, such as sodium hydroxide and/or potassium hydroxide, and such alkali may vary in concentration from about 1% to as high a concentration as that in which sodium stannate is substantially soluble. A preferred concentration range is about 3 to about 20% for sodium hydroxide and about 1 to about 40% for potassium hydroxide, with a concentration of about 5% for either material being specially useful. Sodium hydroxide, being less expensive, is the preferred alkali. Some, but not all, of these alkalis may be replaced by a carbonate such as sodium or potassium carbonate.

The bath may be operated over a wide range of temperatures, say from room temperature to boiling, with temperatures above 60° C. being preferred. Operating time will depend on various factors, such as the size of the scrap charge, current density, etc., although in practice a period of from about 1 to about 5 hours is generally employed. The current density is also variable and its choice depends chiefly on economic factors. The voltage, however, should be at least high enough to decompose water, or about 2.7 volts. The upper limit of the voltage may vary widely. The anode should be insoluble in the bath. Steel is the preferred material, although other materials which do not dissolve in the caustic alkali solution are useful, such as nickel, nickel-plated iron, cobalt, cobalt-plated iron, iron plated with nickel and cobalt, platinum and other noble metals, graphite, silver, and iron alloys such as duriron, stainless steel, etc. The cathode may be any suitable metal, the most common metals being iron or tin. Any variety of tin plate scrap is suitable for detinning.

The tin deposit obtained on the cathode as a result of detinning has good adherent properties and may be melted directly off the cathode. It is to be distinguished over the spongy tin produced by some conventional electrolytic detinning processes which must be scraped, rather than melted, off the cathode. It is fusible, has a good color and a metallic appearance. It may be melted and cast directly, without smelting, in distinction over spongy tin, which must be smelted again before use.

The operation of the bath is quite simple. Impurities introduced thereto along with the scrap, some of which are converted to sodium soaps, may be removed through line 16 and valve 17. When necessary, the bath may be replenished by adding water and caustic alkali in suitable proportions.

Following are some examples illustrating the operation of the above described method and apparatus.

| Run No. | Grams, scrap | Grams, tin | Hours | Current eff., percent | Volts | Temp., °C. | Detinning analysis, percent tin |
|---|---|---|---|---|---|---|---|
| 1 | 305 | 4.05 | 3.00 | 48.8 | 3.2 | 70 | 0.21 |
| 2 | 305 | 4.05 | 3.00 | 48.8 | 3.2 | 73 | .07 |
| 3 | 273 | 3.63 | 2.00 | 65.2 | 2.6 | 81 | .21 |
| 4 | 340 | 4.52 | 3.00 | 54.0 | 3.1 | 88 | .02 |
| 5 | 375 | 5.00 | 2.00 | 91.4 | 3.4 | 87 | .04 |

In all of the runs, relatively small pieces of crumpled scrap were placed in a basket and immersed in a 5% aqueous caustic soda solution.

In the table, the column headed "Grams, tin" represents the calculated amount of tin on the tin plate scrap. The column headed "Detinning analysis, percent tin" represents the analysis of the detinned scrap and shows the amount of tin left on the detinned scrap. All of the runs show that detinning may be completed in about 2 to about 3 hours. In all cases a current of 2.5 amperes was used.

In runs 4 and 5 the basket containing the scrap was turned from top to bottom halfway through the run, since it was noted that that part of the scrap nearest the bath cathode tended to be detinned first. Turning or rotating the scrap thus had the effect of speeding up the detinning of that part of the scrap which was originally more remote from the bath cathode.

Runs 1 and 2 are interesting in that in run 1 the electrical connections were reversed so that the bath anode was above the scrap. The effect of anodic oxygen on the scrap was thus eliminated and only bipolar detinning was operative. In run 2 the bath anode was below the scrap and hence anodic oxygen was able to impinge upon the scrap. According to run 2, it is indicated that oxygen detinning is beneficial since only 0.07% tin was left on the detinned scrap, which is satisfactory. The amount of tin left on the detinned scrap in run 1, 0.21%, is very unsatisfactory for commercial requirements.

In run 3 the bath anode was placed to one side of the bath and the cathode on the other side so that the oxygen generated at the anode merely bubbled up the side of the anode without impinging on the scrap. Accordingly, in this run only the bipolar effect occurred. The scrap basket was turned in this run. Run 3 may be compared with run 5; in the former, despite the fact that less scrap was present, the detinning was much less effective for the same time than in run 5, in which a greater amount of scrap was used. Also, the cathode deposit in run 5 was superior to that of run 3.

In a modification of the above described method and apparatus, the cathodes may be surrounded with means such as a porous wall or diaphragm of microporous rubber or other suitable material, which will allow ions to pass through but not coarser or gross material. The diaphragm thus tends to keep the solution in the cathode vicinity or compartment, i. e. the catholyte, from mechanically mixing with the solution in the anode vicinity or compartment, i. e. the anolyte. The anolyte can then be withdrawn from the plating tank and impurities such as mud or slime and dissolved heavy metals may be removed from it after which it may be returned to the cathode compartment. Thus, as the catholyte becomes denuded of its tin, it may be continuously replaced by the enriched anolyte, and the spent catholyte, which comprises caustic alkali solution, can at the same time be transferred to the anode compartment. Suitable means for withdrawing the anolyte from the anode compartment, purifying it, and returning it to the cathode compartment, and for transferring the catholyte to the anode compartment are provided. Such a modified method and apparatus is shown in Fig. 4, in which tin plate scrap in drum 50 is detinned in the tank 51, the detinning solution 52 being the same as that described. Drum 50 is rotatable in the manner shown in Fig. 3. Current from a source of direct current 53 passes via conductor 54 to anode 55, thence through the solution to the scrap, which functions as a bipolar electrode. The current then passes through the solution above the scrap to the cathodes 56, 57 disposed in cathode compartment 58. The latter surrounds the upper portion of tank 51 and is separated from the main bath solution by the porous diaphragm 59. Current leaves the cathodes through conductor 60.

After the detinning process has been in operation for some time, the anolyte tends to become more concentrated with respect to impurities such as lead, zinc, arsenic, antimony, iron, etc., and it is then withdrawn from tank 51 via line 61 and valve 62 by means of pump 63 and delivered through line 64 to treating tank 65, which may comprise one or a series of stages. The impurities are removed as by means of chemical or other treatment. For example, lead and zinc may be precipitated as sulfides by the addition to the anolyte of sodium sulfide in alkaline solution. Tin does not precipitate in this step. Iron may be separated by removal with the mud or slime. Thereafter, the anolyte is delivered through line 66 to storage tank 67. Undesirable material is removed from tank 65 via line 68. From tank 67 the anolyte may be passed through line 69 to circulating tank 70 and thence through line 71 to the cathode compartment 58. Spent catholyte, which comprises mainly the caustic alkali solution denuded of tin, is removed from the cathode compartment through line 72 and delivered to a spent catholyte tank 73, from which it may be passed via line 74 to anode compartment 75 of the detinning tank.

According to the modification of Fig. 4, the scrap in anode compartment 75 may be detinned by anodic oxygen and the current, while in the cathode compartment 58 a conditioned or purified solution is being depleted of its tin. After the tin concentration of the anolyte has reached a certain level, and its free alkali concentration in turn has decreased, it is removed, purified, and sent to the cathode compartment to give up its tin content and be regenerated with respect to alkali. In other words, the catholyte consists of treated anolyte.

While the invention has been described and illustrated by reference to more or less specific embodiments, it will be understood that the principles of the invention are capable of variation within the scope thereof.

In the light of the foregoing description, the following is claimed:

1. Apparatus for recovering tin from tin plate scrap comprising a vessel for holding bath solution, a rotatable container for scrap submerged in said bath, an insoluble anode in said bath disposed below and separated from the scrap and the container, said anode being insulatedly mounted in said vessel in a substantially horizontal position with respect to said container, a cathode in said bath on that side of the scrap opposite the anode and separated from the anode and from the container and scrap, said scrap being thus positionable intermediate the anode and cathode so as to intercept anodic oxygen generated at the anode and to function as a bipolar electrode, circuit means for connecting the anode and cathode to a source of electric current, and means for rotating the container in the bath.

2. Method for detinning tin scrap and recovering the tin which comprises placing the scrap in a bath containing a solution of caustic alkali and having an insoluble anode disposed below and out of contact with the scrap and a cathode above and out of contact with the scrap; passing an electric current through the bath from the anode to the cathode and intermediately through the scrap; thereby generating oxygen gas at the anode for upward passage through and in intimate contact with the scrap to aid in dissolving the tin, and simultaneously therewith plating tin from the scrap and from the solution upon the cathode.

3. Method for recovering tin from tin scrap which comprises suspending the scrap in a bath of aqueous caustic alkali solution having an insoluble anode disposed below the scrap and a cathode above the scrap, passing an electric current through the bath from the anode to the cathode and intermediately through the solution and through the scrap, thereby generating oxygen gas at the anode for upward passage through and in intimate contact with the scrap to dissolve the tin and to form an anolyte solution in the vicinity of the anode, continuously removing the anolyte solution from the bath, separating from the anolyte solution impurities originally introduced to the bath with the scrap, then returning the anolyte solution to the bath in the vicinity of the cathode, plating the tin content of said latter solution upon the cathode by means of said current and thus forming a catholyte solution in the vicinity of said cathode having a decreased tin content, and continuously passing said catholyte solution to the vicinity of the anode to replace anolyte solution removed therefrom.

FREDERICK A. LOWENHEIM.

References Cited in the file of this patent

UNITED STATES PATENTS

| Number | Name | Date |
|---|---|---|
| 704,675 | Browne et al. | July 15, 1902 |
| 907,061 | Leitch | Dec. 15, 1908 |
| 1,511,967 | Holland | Oct. 14, 1924 |
| 1,983,296 | Lacher et al. | Dec. 4, 1934 |
| 2,196,355 | Cremer | Apr. 9, 1940 |
| 2,200,782 | Vollmer | May 14, 1940 |
| 2,243,165 | Mandl | May 27, 1941 |
| 2,350,669 | Boller | June 6, 1944 |

FOREIGN PATENTS

| Number | Country | Date |
|---|---|---|
| 327,997 | Great Britain | Apr. 15, 1930 |